United States Patent
Kamo

(10) Patent No.: US 9,580,765 B2
(45) Date of Patent: Feb. 28, 2017

(54) DEFORMATION CORRECTING DEVICE

(71) Applicant: NTN CORPORATION, Osaka (JP)

(72) Inventor: Kunio Kamo, Kuwana (JP)

(73) Assignee: NTN CORPORATION, Osaka (JP)

( * ) Notice: Subject to any disclaimer, the term of this patent is extended or adjusted under 35 U.S.C. 154(b) by 51 days.

(21) Appl. No.: 14/608,706

(22) Filed: Jan. 29, 2015

(65) Prior Publication Data

US 2015/0137433 A1    May 21, 2015

Related U.S. Application Data

(62) Division of application No. 12/733,853, filed as application No. PCT/JP2008/002633 on Sep. 24, 2008.

(30) Foreign Application Priority Data

Sep. 28, 2007  (JP) ................................. 2007-253288
Sep. 28, 2007  (JP) ................................. 2007-253289

(Continued)

(51) Int. Cl.
    *C21D 9/08*      (2006.01)
    *C21D 1/63*      (2006.01)
    (Continued)

(52) U.S. Cl.
    CPC ............... *C21D 1/63* (2013.01); *B21B 1/00* (2013.01); *B21B 35/00* (2013.01); *C21D 1/42* (2013.01);
(Continued)

(58) Field of Classification Search
    CPC ....................................................... C21D 1/63
(Continued)

(56) References Cited

U.S. PATENT DOCUMENTS

2010/0230014 A1*  9/2010  Kamo ..................... C21D 1/63
                                                     148/570
2015/0137433 A1*  5/2015  Kamo ..................... C21D 1/63
                                                     266/115
2015/0137434 A1*  5/2015  Kamo ..................... C21D 1/63
                                                     266/129

FOREIGN PATENT DOCUMENTS

JP           49-63115      6/1974
JP           55-082725     6/1980
(Continued)

OTHER PUBLICATIONS

English Translation of the International Preliminary Report on Patentability mailed May 14, 2010 in corresponding International Patent Application PCT/JP2008/002633.
(Continued)

*Primary Examiner* — Scott Kastler

(57) ABSTRACT

A deformation correcting device to correct a deformation occurring in a ring shaped article, which has been heated, while the heated ring shaped article is cooled, includes a support table, on which the ring shaped article in a heated condition is placed; a pair of receiving rolls; a press roll provided in opposition to the pair of receiving rolls with the ring shaped article intervening therebetween; a press roll drive mechanism for driving the press roll between an advanced position, at which the press roll is urged against the outer peripheral surface of the ring shaped article, and a retracted position, at which the press roll is separated away from the outer peripheral surface of the ring shaped article; and a press roll rotating mechanism for rotating the press roll then urged against the ring shaped article by the press roll drive mechanism.

3 Claims, 8 Drawing Sheets

(30) Foreign Application Priority Data

Sep. 28, 2007 (JP) ................................. 2007-253290
Oct. 11, 2007 (JP) ................................. 2007-265389

(51) Int. Cl.
| | |
|---|---|
| C21D 1/667 | (2006.01) |
| C21D 7/02 | (2006.01) |
| C21D 9/40 | (2006.01) |
| F16C 33/64 | (2006.01) |
| B21B 1/00 | (2006.01) |
| B21B 35/00 | (2006.01) |
| C21D 7/13 | (2006.01) |
| C21D 1/42 | (2006.01) |
| C21D 7/10 | (2006.01) |

(52) U.S. Cl.
CPC ............... *C21D 1/667* (2013.01); *C21D 7/02* (2013.01); *C21D 7/13* (2013.01); *C21D 9/085* (2013.01); *C21D 9/40* (2013.01); *F16C 33/64* (2013.01); *C21D 7/10* (2013.01)

(58) Field of Classification Search
USPC ................................................ 266/115, 129
See application file for complete search history.

(56) References Cited

FOREIGN PATENT DOCUMENTS

| JP | 55-158223 | 12/1980 |
|---|---|---|
| JP | 58-35578 | 8/1983 |
| JP | 63-111123 | 5/1988 |
| JP | 05-202414 | 8/1993 |
| JP | 9-176740 | 7/1997 |
| JP | 2004-43909 | 2/2004 |
| JP | 2004-137539 | 5/2004 |
| JP | 2006-179359 | 7/2006 |
| JP | 2007-131902 | 5/2007 |
| JP | 2007-138223 | 6/2007 |
| JP | 2007-239087 | 9/2007 |

OTHER PUBLICATIONS

International Search Report for PCT/JP2008/002633, mailed Dec. 16, 2008.
Extended European Search Report issued Jul. 15, 2013 in corresponding European Application No. 08834332.2.
Chinese Office Action issued Jan. 26, 2011 in corresponding Chinese Patent Application 200880108976.3.
Chinese Office Action issued Jun. 24, 2011 in corresponding Chinese Patent Application 200880108976.3.
Chinese Office Action issued Aug. 25, 2011 in corresponding Chinese Patent Application 200880108976.3.
Japanese Office Action mailed Jan. 8, 2013 in corresponding Japanese Patent Application No. 2007-253288.
Japanese Office Action mailed Jan. 8, 2013 in corresponding Japanese Patent Application No. 2007-253289.
Japanese Office Action mailed Jan. 8, 2013 in corresponding Japanese Patent Application No. 2007-253290.
Japanese Office Action mailed Jan. 8, 2013 in corresponding Japanese Patent Application No. 2007-265389.
Japanese Office Action mailed Apr. 2, 2013 for corresponding Japanese Application No. 2007-253288.
Japanese Office Action mailed Apr. 2, 2013 for corresponding Japanese Application No. 2007-253289.
Japanese Office Action mailed Apr. 2, 2013 for corresponding Japanese Application No. 2007-253290.
Japanese Office Action mailed Apr. 2, 2013 for corresponding Japanese Application No. 2007-265389.
Interrogatory issued Aug. 20, 2013 in corresponding Japanese Application No. 2007-253288.
Interrogatory issued Aug. 20, 2013 in corresponding Japanese Application No. 2007-253289.
Interrogatory issued Aug. 20, 2013 in corresponding Japanese Application No. 2007-253290.
Interrogatory issued Aug. 20, 2013 in corresponding Japanese Application No. 2007-265389.
U.S. Office Action issued Oct. 16, 2012 in copending U.S. Appl. No. 12/733,853.
U.S. Office Action issued Dec. 28, 2012 in copending U.S. Appl. No. 12/733,853.
U.S. Office Action issued May 28, 2014 in copending U.S. Appl. No. 12/733,853.
U.S. Notice of Allowance issued Nov. 7, 2014 in copending U.S. Appl. No. 12/733,853.
U.S. Appl. No. 12/733,853, filed Mar. 24, 2010, Kunio Kamo, NTN Corporation.
U.S. Office Action dated May 16, 2016 from copending U.S. Appl. No. 14/608,633.
U.S. Appl. No. 14/608,633, filed Jan. 29, 2015, Kunio Kamo, NTN Corporation.
U.S. Notice of Allowance dated Jun. 9, 2016 from copending U.S. Appl. No. 14/608,633.

* cited by examiner $\triangle D = D1 - D2$ $\triangle T = T1 - T2$

DEFORMATION CORRECTING DEVICE

CROSS-REFERENCE TO RELATED APPLICATIONS

This application is a divisional of U.S. application Ser. No. 12/733,853, filed on Mar. 24, 2010, which issued as U.S. Pat. No. 8,974,613 on Mar. 10, 2015, which claims the benefit under 35 U.S.C. Section 371, of PCT International Application Number PCT/JP2008/002633, filed Sep. 24, 2008, which claimed priority to Japanese Application Nos. 2007-253288, filed Sep. 28, 2007, 2007-253289, filed Sep. 28, 2007, 2007-253290, filed Sep. 28, 2007 and 2007-265389, filed Oct. 11, 2007, the contents of which are incorporated herein by reference.

BACKGROUND

1. Field

The present invention relates to a method of quenching a ring shaped article such as, for example, a bearing raceway ring or the like, which is performed while correction of a thermal deformation of the ring shaped article is carried out, and an apparatus accomplishing such quenching.

2. Description of the Related Art

If such a ring shaped article as a raceway ring or the like of a bearing assembly is quenched, a deviation may occur in the circularity as a result of thermal deformation. For this reason, after the quenching, a process of correcting such deformation is generally practiced with the use of a ring shaped deformation correcting jig.

However, if correction of the deformation is carried out at a process step separate from the step of quenching, the number of process steps in the manufacturing line for the production of ring shaped articles will increase and, therefore, as shown in FIG. 10, the deformation is corrected when quenching by cooling the ring shaped article W inserted into an arresting die 40. More specifically, after the ring shaped article W has been heated to a quenching temperature (about 850° C.), the ring shaped article W is cooled down to a temperature near to a martensitic transformation point (martensitic transformation temperature: 230° C.) without being restrained in any arresting die; when it is cooled down to such temperature, the ring shaped article W is placed inside the arresting die 40 and is then cooled down to a predetermined temperature (about 110° C.); after the ring shaped article W has been cooled down to such temperature, the ring shaped article W is removed from the arresting die 40; and thereafter the ring shaped article W is allowed to cool naturally down to room temperature.

Also, as one method of correcting the deformation with the use of the arresting die, the method has been suggested, in which using the arresting die of an axially elongated and vertically extending cylindrical configuration, a ring shaped article then at a cooling step of the quenching process is forcibly inserted into the vertically cylindrical arresting die sequentially from above so that the ring shaped article within the arresting die can be pushed sequentially outwardly from below. For example, see Japanese Patent Publication No. H09-176740.

It has, however, been found that the deformation correcting method utilizing the arresting die as hereinabove described requires the arresting die, which tends to incur a high manufacturing cost, to be prepared for each of ring shaped articles of different dimensions. Also, a work of mounting the ring shaped article in the arresting die and a work of removing the ring shaped article from the arresting die after completion of the quenching require a substantial amount of labor. In the case of the deformation correcting method disclosed in Japanese Patent Publication No. H09-176740 referred to above, no work of removing the ring shaped article from the arresting die is needed, but since in this method, the ring shaped article is retained within the arresting die by the effect of a frictional force developed between the arresting die and the ring shaped article, there is the possibility that the ring shaped article of a large dimension tends to fall downwards from the arresting die by the effect of its own weight and, therefore, such method is merely applicable to ring shaped articles of a relatively small dimension.

In view of the above, it has been desired to develop the technology by which without incurring any cost and a labor, thermal deformation of ring shaped articles of varying sizes can be corrected.

Also, a continuous heating furnace largely employed in the conventional quenching apparatus has such problems that it requires the use of a substantial length of the path of travel of an article to be heated in order for the latter to be heated to a quenching temperature and that the equipment tends to become bulky in size. Accordingly, it has been desired that the quenching method and the quenching apparatus, both based on the foregoing technology, require the heating time, which is short, and heating facilities which are compact.

SUMMARY

An object of the present invention is to provide a method of, and an apparatus for, quenching a ring shaped article, in which thermal deformation of the ring shaped article, which occurs as a result of the quenching treatment, can be corrected during the quenching treatment of such ring shaped article; such correction of the thermal deformation can be accomplished without substantially requiring a cost and a labor and can be applied to ring shaped articles of varying sizes; the ring shaped article can be efficiently heated to the quenching temperature; the required heating time is short; and the required equipment is compact.

A method of quenching a ring shaped article in accordance with the present invention includes a heating step of heating the ring shaped article to a quenching temperature; a primary cooling step of cooling the ring shaped article, which has been heated to the quenching temperature, down to a deformation correction initiating temperature, which is higher than a martensitic transformation point; and a secondary cooling step of cooling the ring shaped article, which has been cooled down to the deformation correction initiating temperature, down to a temperature lower than the martensitic transformation point by, while a pair of receiving rolls are held in contact with an outer peripheral surface of such ring shaped article for rotation about an axis of rotation, which is parallel to a center of the ring shaped article, pressing a press roll, rotatable about an axis of rotation parallel to the center of the ring shaped article, against the outer peripheral surface of the ring shaped article from one side of the ring shaped article opposite to a point intermediate between the receiving rolls. The ring shaped article referred to above may be, for example, a raceway ring employed in a bearing assembly.

According to this ring shaped article quenching method, during the second cooling step, while the pair of the receiving rolls are rotatably held in contact with the outer peripheral surface of the ring shaped article, the press roll then rotating is urged against the outer peripheral surface of the ring shaped articles from the opposite side of the receiving rolls, the ring shaped article is cooled. In view of the fact that the ring shaped article is turned between the receiving rolls and the press roll while sandwiching between the receiving rolls and the press roll under a predetermined load, the deformation occurring in the ring shaped article can be corrected with the circularity increased consequently. When the interval between the receiving rolls and the press roll is adjusted, the apparatus can be suited to the ring shaped articles of varying sizes. This deformation correction is performed with no use of any arresting die and, therefore, no cost is incurred in utilizing the arresting die and neither a work to mount the ring shaped article on the arresting die nor a work to remove the ring shaped article from the arresting die is required. Since the deformation correction is performed during the secondary cooling step, no extra step for the deformation correction need not be employed.

In the practice of the present invention, the heating step is carried out by induction heating.

According to this construction, since during the heating step, heating is performed by induction heating to the quenching temperature, the required heating equipment can be compactized as compared with the heating performed by the use of a continuous heating furnace.

In the practice of the present invention, the heating step includes a preheating step of heating by induction heating the ring shaped article to a predetermined preheating temperature near to the quenching temperature and a soaking step of heating the ring shaped article, which has been heated to the preheating temperature, to the quenching temperature within a continuous heating furnace.

According to this construction, since the ring shaped article is heated to the quenching temperature with the use of the preheating step for heating by induction heating and the soaking step for heating within a continuous heating furnace, the ring shaped article can be heated deep by induction heating in a matter of minutes with a good energy efficiency and, also, due to the use of the continuous heating furnace, the ring shaped article in its entirety can be soaked. Although the use is made of the continuous heating furnace, such continuous heating furnace is used only for the purpose of heating the ring shaped article, which has been preheated to a temperature near to the quenching temperature, to the quenching temperature, and, therefore, the heating time can be reduced considerably in contrast to that required to heat from room temperature and the path of transport, through which the ring shaped article is transported within the furnace, may be short and, therefore, resulting in reduction of the size of the equipment.

In the practice of the present invention, an oil bath for cooling the ring shaped article during the primary cooling step and an oil bath for cooling the ring shaped article during the secondary cooling step may be used separately.

The separate use of the cooling oil bath in the primary cooling step and the cooling oil bath in the secondary cooling step is advantageous in that the cooling of the ring shaped article during the primary cooling step, loading of the ring shaped article in between the pair of the receiving rolls and the press roll and the cooling of the ring shaped article during the secondary cooling step can be performed continuously in series with each other. Also, the quenching process line can be designed in a simple configuration.

The length of time during which the press roll is urged against the outer peripheral surface of the ring shaped article is preferably within the range of 40 to 90 seconds. Also, the temperature of the ring shaped article at the time a deformation correction is initiated with the press roll urged against the outer peripheral surface of the ring shaped article is preferably 20° C. to 50° C. higher than the martensitic transformation point.

As a result of a series of tests conducted, it has been found that the length of time during which the deformation correction is carried out with the press roll urged against the outer peripheral surface of the ring shaped article is preferred within the range of 40 to 90 seconds. Also, in order to complete the deformation correction during the cooling step for quenching while the above described length of time during which the deformation correction is carried out is secured, it has been found preferred that urging of the press roll has to be initiated from the temperature that is 20° C. to 50° C. higher than the martensitic transformation point.

An apparatus for quenching a ring shaped article according to the present invention includes a heating station for heating the ring shaped article to a quenching temperature; a primary cooling station for cooling the ring shaped article, which has been heated to the quenching temperature by the heating station, down to a deformation correction initiating temperature, which is higher than a martensitic transformation point; and a secondary cooling station for cooling the ring shaped article, which has been cooled down to the deformation correction initiating temperature by the primary cooling station, down to a temperature lower than the martensitic transformation point by, while a pair of receiving rolls are held in contact with an outer peripheral surface of such ring shaped article for rolling motion about an axis of rotation, which is parallel to a center of the ring shaped article, pressing a press roll, rotatable about an axis of rotation parallel to the center of the ring shaped article, against the outer peripheral surface of the ring shaped article from one side of the ring shaped article opposite to a point intermediate between the receiving rolls.

According to this ring shaped article quenching apparatus, the ring shaped article is cooled at the secondary cooling station in a condition in which while the pair of the receiving rolls are rotatably held in contact with the outer peripheral surface of the ring shaped article, the press roll then rotating is urged against the outer peripheral surface of the ring shaped article from the opposite side. In view of the fact that the ring shaped article is turned between the receiving rolls and the press roll while sandwiching between the receiving rolls and the press roll under a predetermined load, the deformation occurring in the ring shaped article can be corrected with the circularity increased consequently. When the interval between the receiving rolls and the press roll is adjusted, the apparatus can be suited to the ring shaped articles of varying sizes. This deformation correction is performed with no use of any arresting die and, therefore, no cost is incurred in utilizing the arresting die and neither a work to mount the ring shaped article on the arresting die nor a work to remove the ring shaped article from the arresting die is required. Since the deformation correction is performed during the secondary cooling step, no extra step for the deformation correction need not be employed.

In this ring shaped article quenching apparatus of the present invention, the heating station is operable to perform an induction heating.

According to this construction, since at the heating station, heating is performed by induction heating to the quenching temperature, the required heating equipment can be compactized as compared with the heating performed by the use of a continuous heating furnace.

In this ring shaped article quenching apparatus of the present invention, the heating station includes a preheating station for heating by induction heating the ring shaped article to a predetermined preheating temperature near to the quenching temperature and a soaking station for heating the ring shaped article, which has been heated to the preheating temperature, to the quenching temperature within a continuous heating furnace.

According to this construction, since the ring shaped article is heated to the quenching temperature with the use of the preheating station, at which heating by induction heating takes place, and the soaking station, at which heating takes place within a continuous heating furnace, the ring shaped article can be heated deep by induction heating in a matter of minutes with a good energy efficiency and, also, due to the use of the continuous heating furnace, the ring shaped article in its entirety can be soaked. Although the use is made of the continuous heating furnace, such continuous heating furnace is used only for the purpose of heating the ring shaped article, which has been preheated to a temperature near to the quenching temperature, to the quenching temperature, and, therefore, the heating time can be reduced considerably in contrast to that required to heat from room temperature and the path of transport, through which the ring shaped article is transported within the furnace, may be short and, therefore, resulting in reduction of the size of the equipment.

In a preferred embodiment of the present invention, the secondary cooling station of the ring shaped article quenching apparatus referred to above makes use of a ring shaped article deformation correcting device for correcting a deformation of the ring shaped article while the ring shaped article once heated is cooled, which device includes a support table, on which the ring shaped article in a heated condition is placed; a pair of receiving rolls, which rollingly contact an outer peripheral surface of the ring shaped article on the support table; a press roll provided in opposition to the pair of the receiving rolls with the ring shaped article intervening therebetween; a press roll drive mechanism for driving the press roll between an advanced position, at which the press roll is urged against the outer peripheral surface of the ring shaped article, and a retracted position, at which the press roll is separated away from the outer peripheral surface of the ring shaped article; and a press roll rotating mechanism for rotating the press roll then urged against the ring shaped article by the press roll drive mechanism.

According to this ring shaped article deformation correcting device, since the correction of deformation is performed during the cooling step for quenching, the deformation correcting device can be disposed without increasing the number of process steps of the manufacturing line for the ring shaped article.

In the deformation correcting device, it is recommended to use a roll interval adjusting mechanism for adjusting the interval between the receiving rolls. If the interval between the receiving rolls of that pair is adjustable, it is possible to render the apparatus to suit to a further varying size of the ring shaped article.

In the deformation correcting device, it is recommended to use an oil bath for cooling purpose and a deformation correcting time cooling mechanism for immersing the ring shaped article into a quenching oil, contained within the oil bath, at the time of deformation correction to thereby cool the ring shaped article. For example, the deformation correcting time cooling mechanism may include a support unit for tiltably supporting the support table such that a ring shaped article support area of the support table, where the ring shaped article is placed, may be lowered, and a tilting unit for tilting the support table supported by the support unit, so that when the support table is tilted by the tilting unit, the ring shaped article can be immersed into the quenching oil within the oil bath.

The provision of the deformation correcting time cooling mechanism is effective to allow the ring shaped article to be corrected to remove the deformation while being sufficiently cooled. If the deformation correcting time cooling mechanism is made up of the support unit and the tilting unit, the ring shaped article can be assuredly immersed into the quenching oil contained within the oil bath to cool it even though it is a simplified construction.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

Figure 1:
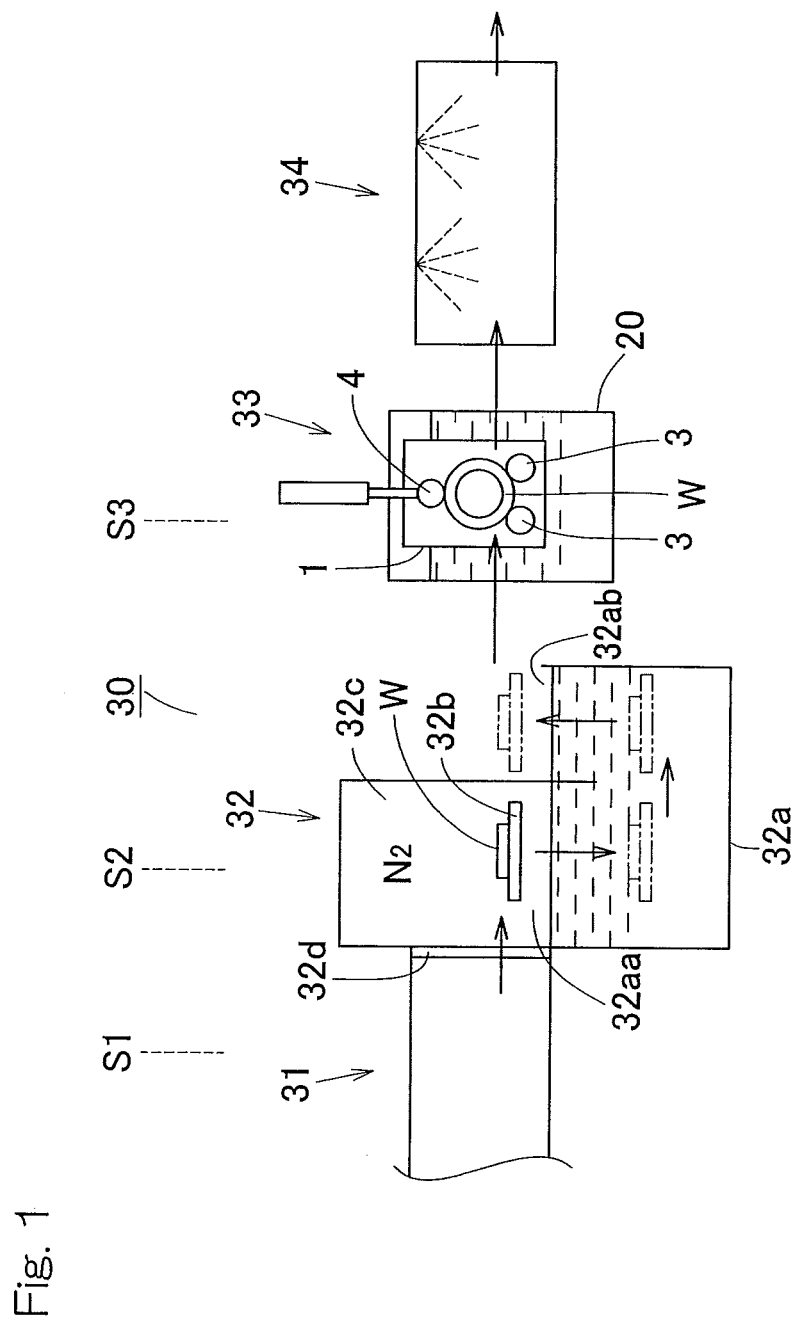
FIG. 1 is a diagram showing a conceptual construction of a quenching apparatus that is employed in executing a method of quenching a ring shaped article according to a first preferred embodiment of the present invention.

A method of quenching a ring shaped article according to a first preferred embodiment of the present invention will be described with particular reference to FIGS. 1 and 2A and 2B, which illustrate an apparatus used to execute such quenching method. Referring first to FIG. 1, the quenching apparatus for quenching the ring shaped article is generally identified by 30 and includes a heating station 31, a primary cooling station 32, a secondary cooling station 33, and a cleansing station 34. The heating station 31 makes use of a heating furnace or the like to heat the ring shaped article W to a quenching temperature (for example, 850° C.) (a heating step S1). The primary cooling station 32 is for primarily cooling the ring shaped article W, which has been heated to the quenching temperature, down to a temperature (for example, 290° C.), which is higher than the martensitic transformation point, by immersing such ring shaped article W within a quenching oil contained in a primary cooling bath 32a (a primary cooling step S2). The secondary cooling station 33 is for secondarily cooling the ring shaped article W, which has been primarily cooled, down to a predetermined temperature (for example, 110° C.) by immersing a quenching oil, contained in an oil bath 20, while a deformation correction is performed by means of a deformation correcting device 1 (a secondary cooling step S3). The cleansing station 34 is for cleansing the ring shaped article W, which has been secondarily cooled, and then transferring it to the subsequent processing step.

In the practice of this first preferred embodiment, the primary cooling bath 32a of the primary cooling station 32 has an oil accommodating portion of a U-shaped sectional shape having opposite ends that define an introducing area 32aa and a delivery area 32ab, respectively, which oil accommodating portion is so designed that the ring shaped article W can be transported from the introducing area 32aa at one end thereof towards the delivery area 32ab at the opposite end thereof by means of an elevator 32b. A space 32c above the introducing area 32aa is rendered to be a closed space filled with a nitrogen gas $N_2$. An open/close door 32d is provided between the space 32c and the heating station 31. According to the construction of this primary cooling bath 32a, the ring shaped article W heated by the heating station 31 is immediately loaded into the space 32c; filled with the nitrogen gas $N_2$ and is subsequently immersed into the quenching oil, and, accordingly, the cooling can be readily performed without the ring shaped article W being exposed to the atmosphere.

Figure 2A:
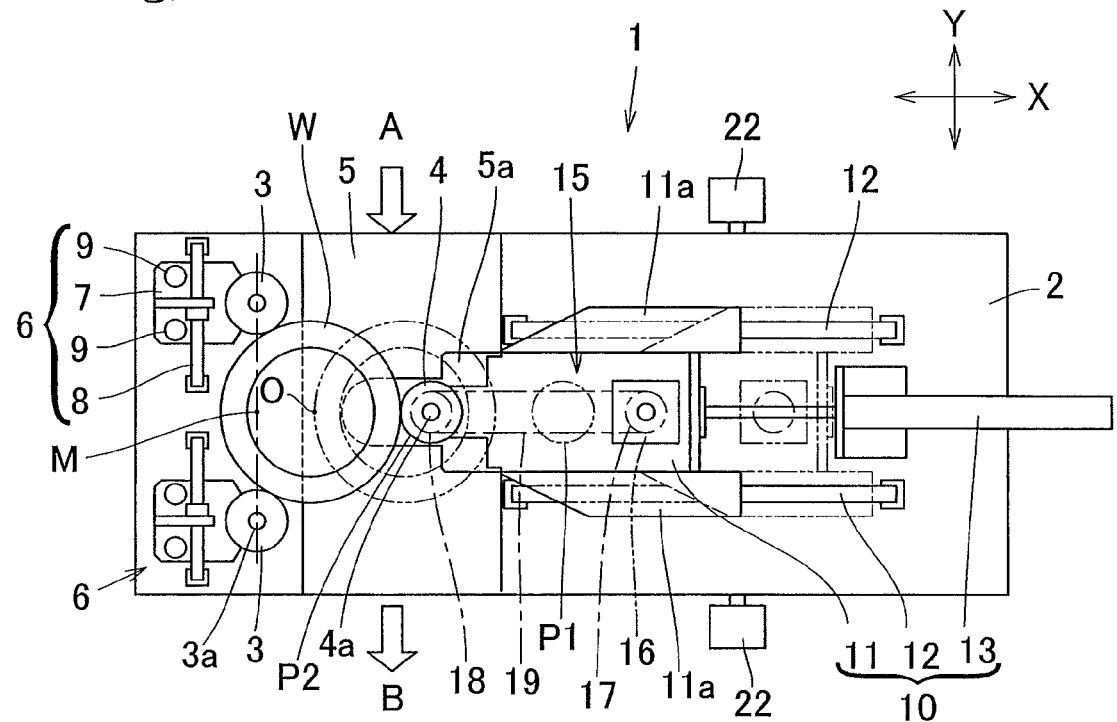
FIG. 2A is a top plan view showing a deformation correcting device employed in the quenching apparatus.
Figure 2B:
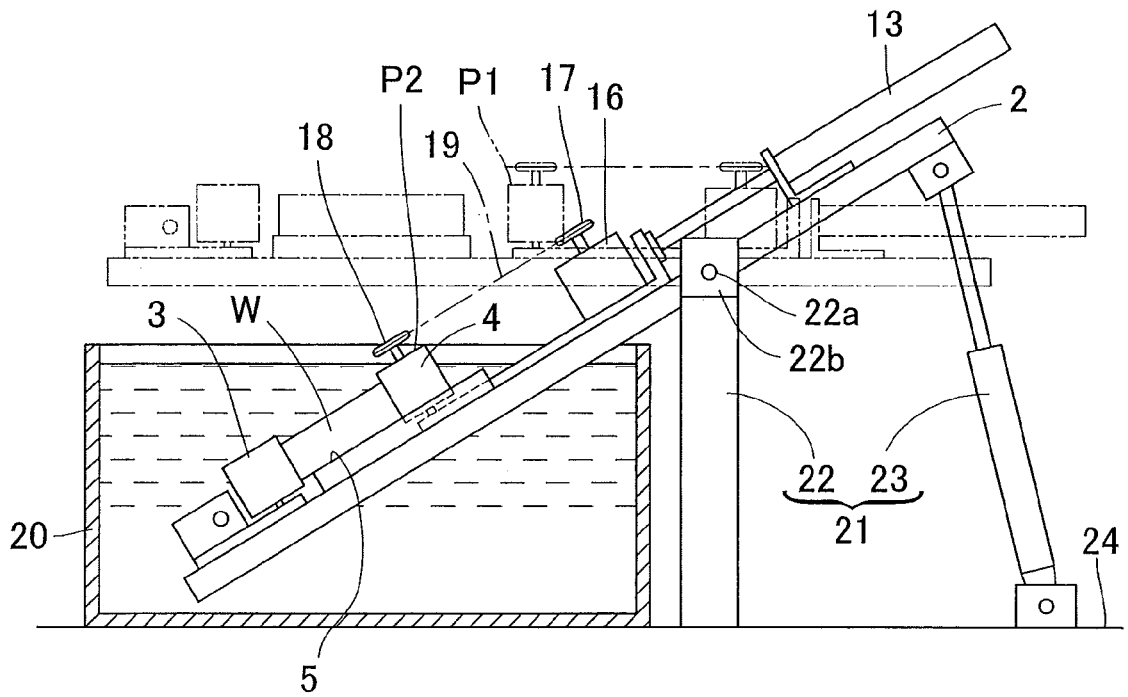
FIG. 2B is a front elevational view showing the deformation correcting device shown in FIG. 2A.

As shown in FIGS. 2A and 2B, the deformation correcting device 1 of the secondary cooling station 33 includes a support table 2 for the support of the ring shaped article W thereon, and a pair of receiving rolls 3 and a press roll 4 mounted on the support table 2. The receiving rolls 3 are rotatably mounted on respective support shafts 3a protruding upwardly from associated receiving roll support members 7. The press roll 4 is mounted on a press roll support shaft 4a for rotation together therewith, which shaft 4a protrudes upwardly from a press roll support member 11 and is rotatable relative to such press roll support member 11. The ring shaped article W is in the form of, for example, a raceway member of a bearing assembly. The raceway ring of the bearing assembly is that formed by means of a forging process and has an inner peripheral surface or an outer peripheral surface formed with a raceway groove by means of a grinding process. Material for the bearing raceway ring may is, for example, a steel material such as, for example, a bearing steel.

A portion of the top surface of the support table 2 between the pair of the receiving rolls 3 and the press roll 4 is designed as a ring shaped article support area 5 and a region thereof ranging from one to the other of opposite ends in a direction (Y-axis direction) of arrangement of the receiving rolls 3 is so formed as to lie at a level higher than that of the other portion thereof. This ring shaped article support area 5 is formed with a cutout 5a for the purpose of avoiding an interference thereof with the press roll 4 and the press roll support member 11 when the press roll 4 is advanced as will be described later. In the neighborhood of the support table 2, there is provided a loading and discharging mechanism (not shown) for loading the ring shaped article W onto the ring shaped article support area 5 from a direction shown by the arrow A and discharging the ring shaped article W from the ring shaped article support area 5 towards a direction shown by the arrow B.

The pair of the receiving rolls 3 are spaced a distance in the Y-axis direction from each other, which distance can be adjusted by a receiving roll interval adjusting mechanism 6 employed in association with each of the receiving rolls 3. The receiving roll interval adjusting mechanism 6 includes the receiving roll support member 7, on which the respective receiving roll 3 is rotatably mounted, a guide 8 for displaceably guiding the receiving roll support member 7 relative to the support table 2 in the Y-axis direction, and a fixing unit 9 for fixing the receiving roll support member 7 to the support table 2. For this fixing unit 9, for example, a bolt or any fixing jig for fastening by the utilization of a frictional force can be employed.

The press roll 4 is adapted to be driven between advanced and retracted positions by a press roll drive mechanism 10 in a direction (X-axis direction) along a path passing through a point M intermediate between the receiving rolls 3 and then through the longitudinal axis O of the press roll 4. The press roll drive mechanism 10 includes the press roll support member 11 for rotatably supporting the press roll 4 as hereinbefore described, X-axis direction guide rods 12 along which respective to-be-guided elements 11a, mounted on the press roll support member 11, are mounted for movement relative thereto, and a drive unit 13 for driving the press roll support member 11 in the X-axis direction relative to the support table 2. The to-be-guided elements 11a serve to guide the associated guide rods 12 by the effect of, for example, a sliding guide or a rolling guide. The drive unit 13 is comprised of, for example, a hydraulic cylinder.

The press roll 4 is also adapted to be rotated by a press roll rotating mechanism 15 in a predetermined direction. This press roll rotating mechanism 15 is of a structure, in which a rotating motor 16 is mounted on the press roll support member 11 and a drive chain 19 is trained between a sprocket 17, mounted on an output shaft of the rotating motor 16, and a sprocket 18 mounted on the support shaft of the press roll 4.

As best shown in FIG. 2B, an oil bath for cooling the ring shaped article is disposed below the ring shaped article support area 5 of the support table 2, and the ring shaped article W resting on the ring shaped article support area 5 can be immersed into the quenching oil contained in this oil bath 20. A deformation correcting time cooling mechanism 21 therefor is made up of a support unit 22 for supporting the support table 2 so that one side of the support table 2 adjacent the ring shaped article support area 5 can be tiltably lowered, and a tilting unit 23 for tilting the support table 2 supported by this support unit 22. In the illustrated embodiment, the support unit 22 is of a structure, in which a horizontally extending tilt center shaft 22a, protruding outwardly from opposite Y-axis direction sides of the support table 2 can be rotatably supported by corresponding pivot support members 22. Also, the tilting unit 23 is comprised of a hydraulic cylinder provided between a lower surface of the support table 2, positioned on one side of the tilt center shaft 22a opposite to the ring shaped article support area 5, and a floor surface 24. As shown by the solid line in FIG. 2B, when the support table 2 is tilted by the drive of the tilting unit 23, the ring shaped article W resting on the ring shaped article support area 5 can be immersed into the oil within the oil bath 20.

The deformation correction, accomplished by the deformation correcting device 1 at the secondary cooling station 33 shown in FIG. 1, will now be described with particular reference to FIGS. 2A and 2B. The deformation correcting device 1 is held standby at a retracted position P1 with the press roll 4 having been retracted relative to the receiving rolls 3 as shown by the chain line in FIG. 2A. At this time, the support table 2 is held in a horizontal condition. The ring shaped article W, shown by the chain line and emerging outwardly from the primarily cooling bath 32a shown in FIG. 1, is loaded on the ring shaped article support area 5 of the deformation correcting device 1, then held standby as described above, from a direction shown by A by the action of the loading and discharging mechanism (not shown). When the ring shaped article W is so loaded, as shown by the solid line in FIG. 2A, the drive unit 13 of the press roll drive mechanism 10 is driven to advance the press roll 4 to an advanced position P2. In this way, as shown by the solid line in FIG. 2A, the ring shaped article W is held by the pair of the receiving rolls 3 and the press roll 4 with its outer peripheral surface restrained from both sides of the X-axis direction. In this condition, the rotating motor 16 of the press roll rotating mechanism 15 shown in FIG. 2A is driven to rotate the press roll 4 in the predetermined direction. While the ring shaped article W is restrained under a predetermined load by the pair of the receiving rolls 3 and the press roll 4 from the opposite sides, the ring shaped article W is rotated between the rolls 3 and 4 so that a deformation can be corrected to allow the ring shaped article W to have an increased circularity.

Also, about the time of initiation of the above described deformation correction, that is, initiation of rotation of the press roll 4, as shown by the solid line in FIG. 2B, the tilting unit 23 of the deformation correcting time cooling mechanism 21 is driven to tilt the support table 2 with the ring shaped article support area 5 lowered consequently. Accordingly, the ring shaped article W is immersed into the quenching oil contained in the oil bath 20 and is therefore secondarily cooled. Since loading of the ring shaped article W onto the ring shaped article support area 5, advance of the press roll 4, rotation of the press roll 4 and tilting of the support table 2 take place continuously, the primary cooling and the secondary cooling are performed with no substantial time spent therebetween. For this reason, quenching takes place favorably.

The temperature of the ring shaped article W at the time the deformation correction is initiated with the press roll 4 urged against the outer peripheral surface of the ring shaped article W is chosen to be a temperature 20° C. to 50° C. higher than the martensitic transformation point. It is to be noted that the time of deformation correction is to be construed as meaning the time span between the time, at which pressing by the press roll 4 is initiated, and the time at which it is completed. Also, the length of time during which the deformation correction is carried out with the outer peripheral surface of the ring shaped article W urged by the press roll 4, is chosen to be about 40 to 90 seconds. When the ring shaped article W of the above described temperature is immersed only for the above described length of time into the quenching oil within the oil bath 20, the ring shaped article W is cooled down substantially to a target cooling temperature (for example, 110° C.) of the secondary cooling. Accordingly, with no waste of time, the deformation correction and the secondary cooling are carried out. Upon completion of the deformation correction and the secondary cooling, the support table 2 is again returned to the initial, horizontal condition and the rotation of the press roll 4 is halted, followed by retraction of the press roll 4 back to the retracted position P1, at which time the ring shaped article W is released. The ring shaped article W so released is, by the action of the loading and discharging mechanism (not shown), discharged in a direction, shown by B in FIG. 2A, from the ring shaped article support area 5 of the support table 2 to the outside of the support table 2.

The deformation correcting device 1 of the construction described above designed for the ring shaped article is such that since the press roll 4 can be selectively movable between the advanced and retracted positions, the distance between the pair of the receiving rolls 3 and the press roll 4 can be changed as desired. For this reason, it can be applied to ring shaped articles W of any varying diameters. The spacing between the receiving rolls 3 may be changed by the receiving roll interval adjusting mechanism 6 to suit to the size of the ring shaped article W. The deformation correction of the ring shaped article W by the deformation correcting device 1 require no allowance for a die, since no arresting die is utilized, and, also, no work is required to mount the ring shaped article W onto the die nor remove it from the die.

The quenching apparatus 30 of the present invention is such that since the deformation correction is carried out during the secondary cooling step S3 by the deformation correcting device 1 of the secondary cooling station 33, there is no need to provide an extra step of deformation correction. Since the primary cooling oil bath 32a of the primary cooling station 32 and the secondary cooling oil bath 20 of the secondary cooling station 33 are separate from each other, it is possible to consecutively perform the cooling of the ring shaped article W at the primary cooling station 32, the loading of the ring shaped article W in between the pair of the receiving rolls 3 and the press roll 4, and the cooling of the ring shaped article W at the secondary cooling station 33. Also, the processing line of the quenching apparatus 30 can be simplified in structure.

Figure 3:
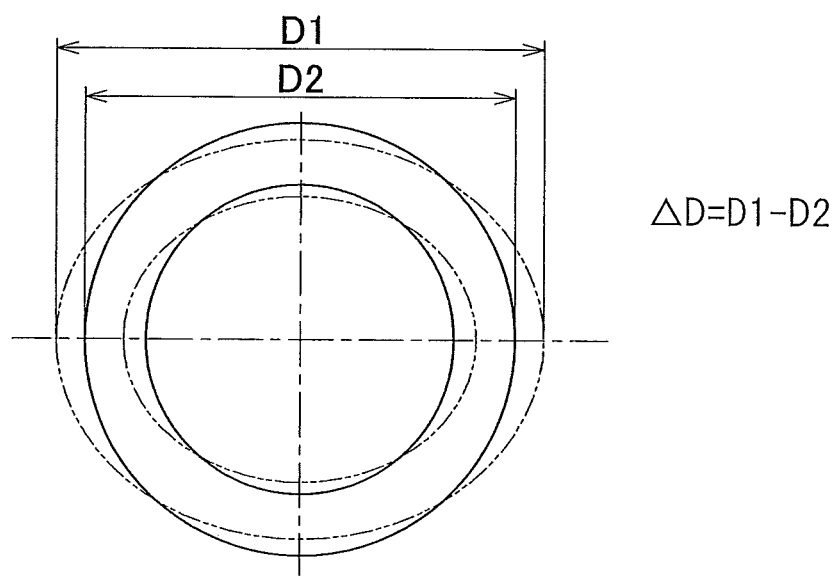
FIG. 3 is an explanatory diagram showing the amount of change in outer diameter of the ring shaped article.
Figures 4A, 4B:
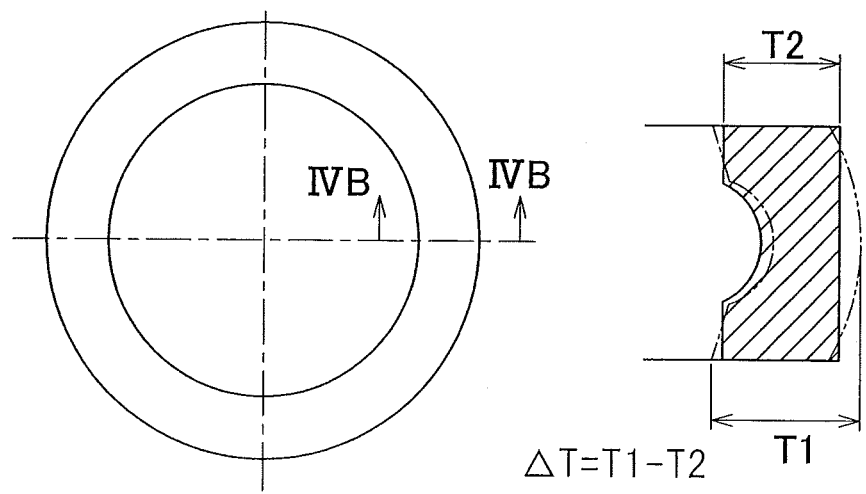
FIGS. 4A and 4B are explanatory diagrams showing the amount of change in wall thickness of the ring shaped article.

In order to ascertain the effect of deformation correction carried out during the secondary cooling step S3 at the secondary cooling station 33 of the quenching apparatus 30 of the structure described above, a series of tests were conducted. During the series of the tests, ring shaped articles each made of a bearing steel and having a size of 280 mm in diameter, 250 mm in inner diameter and 15 mm in wall thickness. With respect to each of those ring shaped articles, the amount of change in outer diameter ΔD and the amount of change in wall thickness ΔT were measured by stepwise varying the pull-up temperature of the primary cooling and the press load of the press roll 4 in a plurality of stages. The amount of change in outer diameter ΔD represents the difference between the outer diameter D1 before the deformation correction and the outer diameter D2 after the deformation correction (FIG. 3). The amount of change in wall thickness ΔT represents the difference between the wall thickness T1 before the deformation correction and the wall thickness T2 after the deformation correction (FIGS. 4A and 4B). For each of the amounts of change in outer diameter ΔD and the amounts of change in wall thickness ΔT, the average value x, the standard deviation value σ and the maximum value Max were determined. Results of those tests are tabulated in Table 1 below.

TABLE 1

| Load | | 230° C. | | | 250° C. | | | 280° C. | | |
|---|---|---|---|---|---|---|---|---|---|---|
| | | X | σ | Max | x | σ | Max | x | σ | Max |
| 150 kgf | Amt. of Outer Dia. Change ΔD | 1.37 | 0.47 | 1.88 | 0.21 | 0.16 | 0.40 | 0.22 | 0.11 | 0.42 |
| | Amt. of Wall Thic. Change ΔT | 0.16 | 0.02 | 0.19 | 0.31 | 0.01 | 0.33 | 0.30 | 0.03 | 0.32 |
| 300 kgf | Amt. of Outer Dia. Change ΔD | — | — | — | 0.16 | 0.08 | 0.25 | 0.16 | 0.03 | 0.22 |
| | Amt. of Wall Thic. Change ΔT | — | — | — | 0.28 | 0.13 | 0.36 | 0.30 | 0.03 | 0.35 |
| 580 kgf | Amt. of Outer Dia. Change ΔD | 0.25 | 0.12 | 0.35 | — | — | — | 0.12 | 0.03 | 0.14 |
| | Amt. of Wall Thic. Change ΔT | 0.18 | 0.07 | 0.24 | — | — | — | 0.34 | 0.03 | 0.37 |

The results of the tests have revealed as follows.

(1) Regarding the amount of change in outer diameter ΔD, when the primary cooling pull-up temperature was 250° C. and 280° C. and the press load was 300 kgf, an excellent result could be obtained. Also, even when the primary cooling pull-up temperature was 280° C. and the press load was 580 kgf, an excellent result could be obtained.

(2) Regarding the amount of change in wall thickness ΔT, when the primary cooling pull-up temperature was 230° C., 250° C. and 280° C. and the press load was 150 kgf, when the primary cooling pull-up temperature was 250° C. and 280° C. and the press load was 300 kgf, and when the primary cooling pull-up temperature was 230° C. and the press load was 580 kgf, respective excellent results could be obtained.

(3) From the foregoing, it has been ascertained that the excellent results in the amount of change in outer diameter ΔD and the amount of change in wall thickness ΔT can be obtained when the primary cooling pull-up temperature is 250° C. and 280° C. and the press load is 300 kgf.

Figure 5:
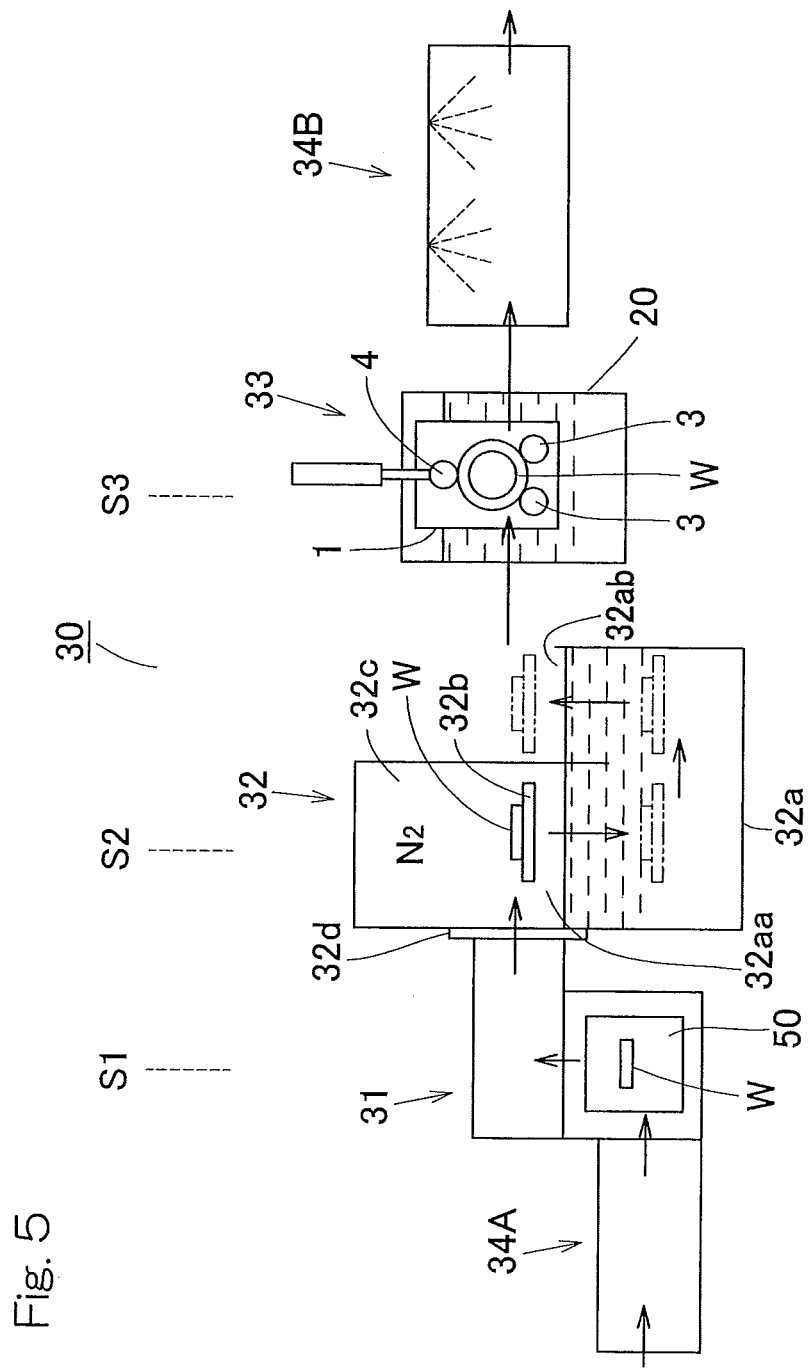
FIG. 5 is a diagram showing a conceptual construction of the quenching apparatus used to execute the method of quenching the ring shaped article according to a second preferred embodiment of the present invention.

The method of quenching the ring shaped article according to a second preferred embodiment of the present invention will be described with particular reference to FIGS. 5 to 8A and 8B, which illustrate the apparatus used to execute such quenching method. The second preferred embodiment is basically similar in structure to that according to the previously described first embodiment except that heating performed by the heating station 31 used during the heating step S1 in the practice of the previously described first embodiment is carried out by means of induction heating. Accordingly, component parts employed in the second embodiment, but similar to those in the first embodiment are shown by like reference numerals and the details are not therefore reiterated for the sake of brevity. As shown in FIG. 5, the ring shaped article quenching apparatus 30 employed in the practice of the second embodiment of the present invention includes a pre-cleansing station 34A, a heating station 31, a primary cooling station 32, a secondary heating station 33 and a post-cleansing station 34B.

At the pre-cleansing station 34A, swarfs and oil content, which adhere to the ring shaped article W during a turning process, are cleansed off. At the heating station 31, the ring shaped article W, which has been pre-cleansed at the pre-cleansing station 34A, is heated by induction heating to a predetermined quenching temperature (for example, 850° C.) by an induction heating device 50 (a heating step S1). At the primary cooling station 32, in a manner similar to that in the previously described first embodiment, the ring shaped article W, which has been heated to the quenching temperature, is immersed in the quenching oil contained in the primary cooling bath 32a so that the ring shaped article W can be primarily cooled down to a temperature (for example, 290° C.) that is higher than the martensitic transformation point (a primary cooling step S2). At the secondary cooling station 33, the ring shaped article W, which has been primarily cooled, is immersed into the quenching oil within the oil bath 20 while deformation thereof is corrected by the deformation correcting device 1, so that the ring shaped article W can be secondarily cooled down to a predetermined temperature (for example, 110° C.) (a secondary cooling step S3). At the post-cleansing station 34B, the ring shaped article W, which has been secondarily cooled, is transferred to the subsequent processing step.

Figure 6:
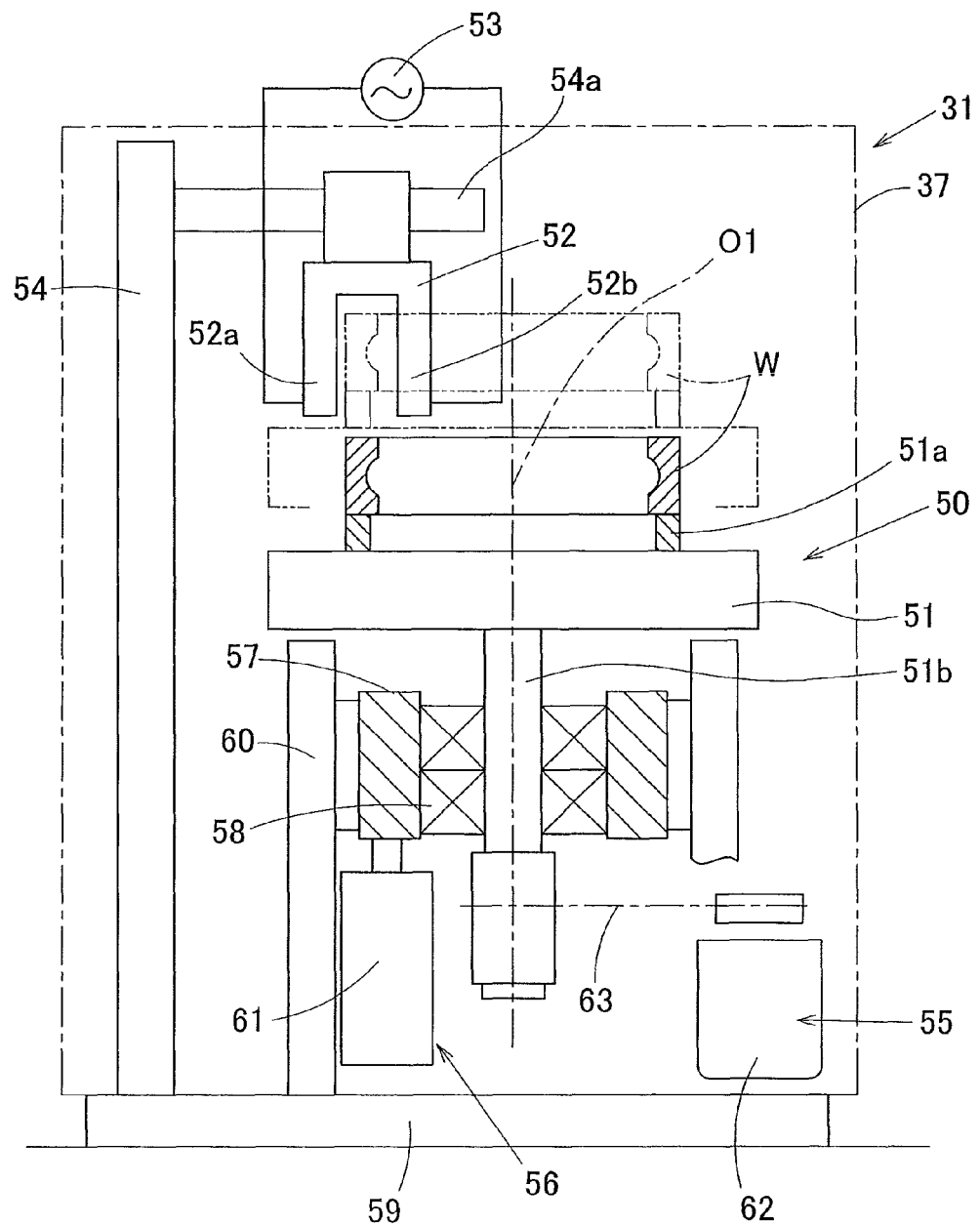
FIG. 6 is a front elevational view, with a portion cut out, showing an induction heating device employed at a preheating station in the quenching apparatus.

The structure of the induction heating device 50 of the heating station 31 is best shown in FIG. 6. This induction heating device 50 includes a rotary table 51 for turning a ring shaped article W, placed on such rotary table 51, about a ring center O1, a heating coil 52 and an alternating current power source 53 for supplying an electric current to the heating coil 52. The alternating current power source 53 is rendered to be, for example, a high frequency power source. A heating chamber 37, in which the induction heating device 50 is installed, is of an atmosphere filled with a nitrogen gas $N_2$.

Figure 7A:
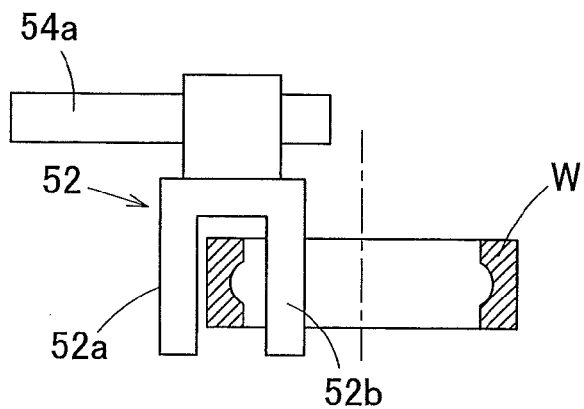
FIG. 7A is an explanatory diagram showing a first example of adjusting the position of a heating coil employed in the induction heating device.
Figure 7B:
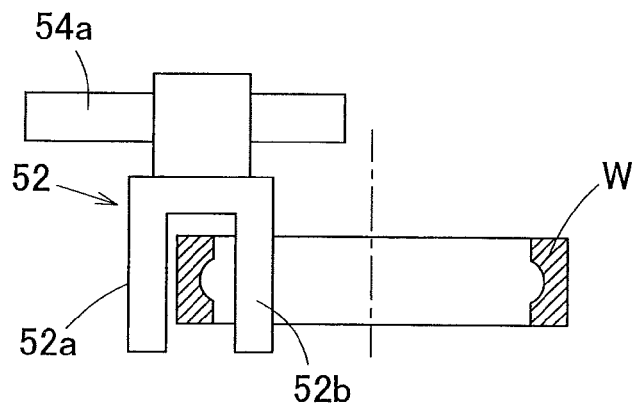
FIG. 7B is an explanatory diagram showing a second example of adjusting the position of the heating coil.
Figure 8A:
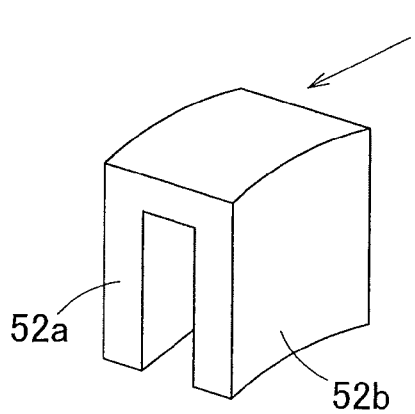
FIG. 8A is a perspective view showing the heating coil.

The heating coil 52 is of a downwardly oriented U-shaped configuration structured so as to straddle between inner and outer peripheral sides of the ring shaped article W as best shown in, for example, FIGS. 6 and 7A and 7B. Opposite arms 52a and 52b of the heating coil 52 have their free ends connected across the alternating current power source 53. FIG. 8A illustrates a perspective view of the heating coil 52 shown in FIGS. 6 and 7A and 7B.

Figure 8B:
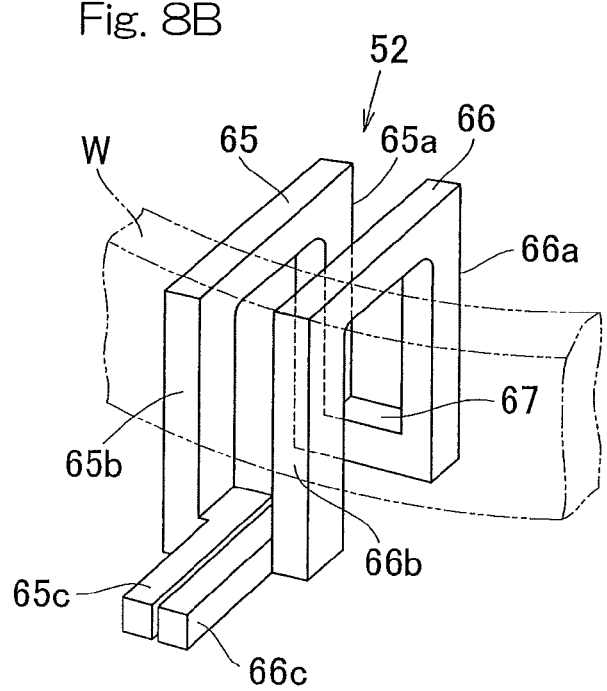
FIG. 8B is a perspective view showing a different heating coil.

For the heating coil 52, such a structure may be employed, in which as best shown in FIG. 8B, two U-shaped conductors 65 and 66 are so arranged as to permit their leg conductors 65a, 65b, 66a and 66b to extend parallel to each other, one of the leg conductors 65a and 66a have their free ends connected with each other through a connecting conductor 67, and the other of the leg conductors 65b and 66b have their free ends provided with respective lead portions 65c and 66c, which are in turn connected across the alternating power source 53.

Referring to FIG. 6, the heating coil 52 is so arranged that the position thereof can be adjustable in a direction radially of the rotary table 51 relative to a heating coil support body 54. The heating coil support body 54 includes, for example, a guide rod 54a extending in a direction radially of the rotary table 51, and the heating coil 52 can be adjusted in position continuously along this guide rod 54a. At an arbitrary adjusted position, the heating coil 52 is fixed in position to the guide rod 54a by means of, for example, a bolt (not shown) or the like. Thus, since the position of the heating coil 52 is adjustable, the position of the heating coil 52 can be changed to suit to a relatively small ring shaped article W as is the case with a first example shown in FIG. 7A, or the position of the heating coil 42 can be changed to suit to a relatively large ring shaped article W as is the case with a second example shown in FIG. 7B.

A contact pedestal 51a is provided in the rotary table 51 for the purpose of reducing the surface area of contact with the ring shaped article W. This contact pedestal 51a is rendered to be replaceable with another one depending on the diameter of the ring shaped article W.

The rotary table 51 is rotationally driven by a rotary table rotating device 55 and can be also moved by a rotary table elevating device 56 between a position, at which the ring shaped article W placed on the rotary table 51 enters in between the opposite arms 52a and 52b of the heating coil 52, and a position in which such ring shaped article W departs from a space between the opposite arms 52a and 52b of the heating coil 52.

In the example as shown, the rotary table 51 is rotatably provided on an elevating frame 57 through bearings 58, and the elevating frame 57 is arranged on a base support 59 through an elevation guide member 60 for movement up and down along the elevation guide member 60. The elevating frame 57 is drivingly coupled with an elevating drive source 61 such as, for example, a hydraulic cylinder and, accordingly, the rotary table 51 is moved up and down by the elevating drive source 61 together with the elevating frame 57.

The rotary table rotating device 55 is made up of a motor 62 and a rotation transmitting mechanism 63 such as, for example, pulleys or a gear train for transmitting the rotation of the motor 62 to a shaft 51b of the rotary table 51.

As hereinabove described, in the second embodiment of the present invention, since during the heating step S1, the ring shaped article is induction heated by the induction heating device 50 at the heating station 32 to the quenching temperature, the heating facility can be compactized as compared with the heating with the use of a continuous heating furnace. Other functions and effects are similar to those afforded by the previously described first embodiment.

Figure 9:
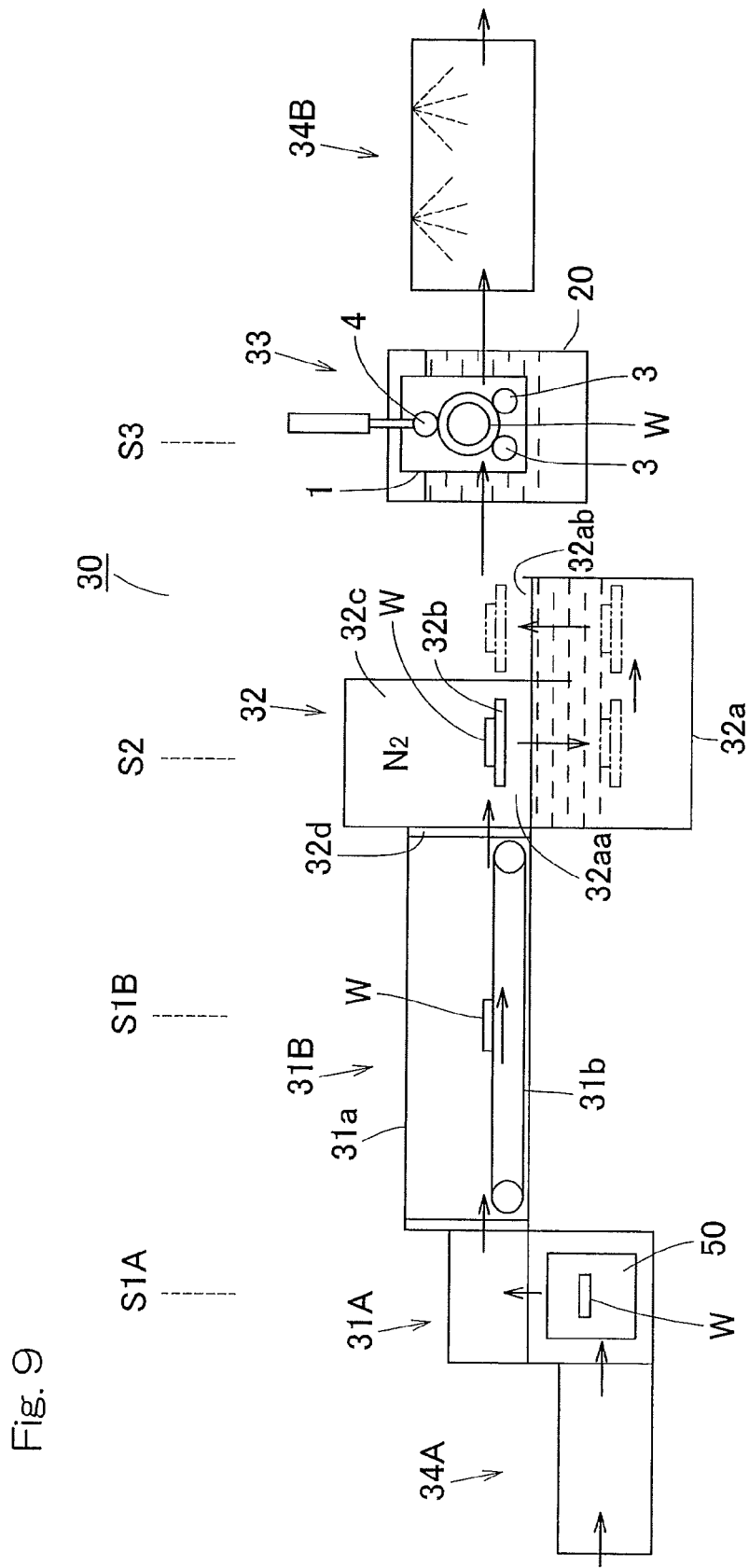
FIG. 9 is a diagram showing a conceptual construction of the quenching apparatus used to execute the method of quenching the ring shaped article according to a third preferred embodiment of the present invention.
Figure 10:
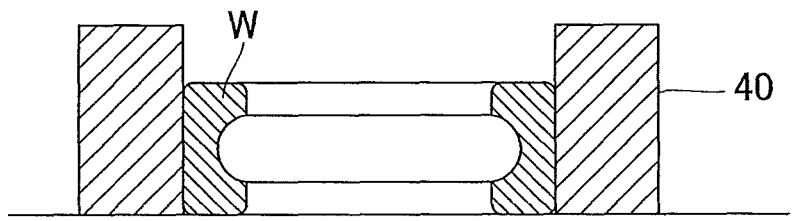
FIG. 10 is an explanatory diagram showing the conventional deformation correcting method.

The method of quenching the ring shaped article according to a third preferred embodiment of the present invention will be described with particular reference to FIG. 9, which illustrates the apparatus used to execute such quenching method. The third preferred embodiment is basically similar in structure to that according to the previously described first embodiment, except that the heating step S employed in the practice of the previously described first embodiment is divided into two steps, i.e., a preheating step S1A, including a preheating station 31A, and a soaking step S1B including a soaking station 31B. Accordingly, component parts employed in the third embodiment, but similar to those in the first embodiment may be occasionally shown by like reference numerals and the details are not therefore reiterated for the sake of brevity. As shown in FIG. 9, the ring shaped article quenching apparatus 30 according to this third preferred embodiment includes a pre-cleansing station 34A, a preheating station 31A, a soaking station 31B, a primary cooling station 32, a secondary cooling station 33 and a post-cleansing station 34B.

At the pre-cleansing station 34A, swarfs and oil content, which adhere to the ring shaped article W during a turning process, are cleansed off. At the heating station 31A, the ring shaped article W, which has been pre-cleansed at the pre-cleansing station 34A, is heated by induction heating to a predetermined preheating temperature, which is near to the quenching temperature, by an induction heating device 50 (a heating step S1A). At the soaking station 31B, the ring shaped article W, which has been heated to the preheating temperature, is heated to a predetermined quenching temperature (for example, 850° C.) within the continuous heating furnace 31a (a soaking step S1B). At the primary cooling station 32, the ring shaped article W, which has been heated to the quenching temperature, is immersed in the quenching oil contained in the primary cooling bath 32a so that the ring shaped article W can be primarily cooled down to a temperature (for example, 290° C.) that is higher than the martensitic transformation point (a primary cooling step S2). At the secondary cooling station 33, the ring shaped article W, which has been primarily cooled, is immersed into the quenching oil within the oil bath 20 while deformation thereof is corrected by the deformation correcting device 1, so that the ring shaped article W can be secondarily cooled down to a predetermined temperature (for example, 110° C.) (a secondary cooling step S3). At the post-cleansing station 34B, the ring shaped article W, which has been secondarily cooled, is transferred to the subsequent processing step.

The induction heating device 50 employed at the preheating station 31A used in the practice of the third preferred embodiment is of a structure identical with the induction heating device 50 employed at the heating station 31 used in the practice of the previously described second preferred embodiment and, therefore, the details thereof are not reiterated for the sake of brevity, but there is such a difference that in contrast to the use of the induction heating device 50 at the preheating station 31A according to the third embodiment for the purpose of heating by induction heating of the ring shaped article to the predetermined preheating temperature near to the quenching temperature, the heating station 31 according to the previously described second embodiment makes use of the induction heating device 50 for the purpose of heating to the quenching temperature. The structure and the description of the heating coil 52 shown in FIGS. 7A and 7B and FIGS. 8A and 8B are also equally applicable to the third preferred embodiment of the present invention and, therefore, the details thereof are not reiterated for the sake of brevity.

As best shown in FIG. 9, the continuous heating furnace 31a at the soaking station 31B is a furnace for heating the ring shaped articles W while the latter are transported successively in a row by a transport unit 31b such as, for example, a conveyor within the interior of such furnace that is kept under a high temperature atmosphere.

Even in this third embodiment of the present invention, the process steps subsequent to the primary cooling step S2 are identical with those employed in the practice of the previously described first embodiment and the structure and the description of the ring shaped article deformation correcting device 1 shown in FIGS. 2A and 2B are also equally applicable thereto and, therefore, the details thereof are not reiterated for the sake of brevity.

As described hereinbefore, according to the quenching apparatus 30 of the third embodiment of the present invention, since heating is effected to the quenching temperature through the preheating station 31A, at which the heating takes place by means of induction heating, and also through the soaking station 31B, at which the heating takes place by means of the continuous heating furnace 31a, the ring shaped article W can be heated deep by induction heating in a matter of minutes with a good energy efficiency and, also, due to the use of the continuous heating furnace 31a, the ring shaped article W in its entirety can be soaked. Since although the use is made of the continuous heating furnace 31a, the continuous heating furnace 31a is used only for the purpose of heating the ring shaped article W, which has been preheated to a temperature near to the quenching temperature, to the quenching temperature, the heating time can be reduced considerably in contrast to that required to heat from room temperature. Also, the path of transport, through which the ring shaped article W is transported within the furnace, may be short and, therefore, the equipment can be reduced in size.

The deformation correcting device 1 according to any one of the foregoing embodiments of the present invention can be embodied in the following modes.

[Mode 1]
A deformation correcting device for correcting a deformation occurring in a ring shaped article, which has been heated, while the heated ring shaped article is cooled, which device comprises a support table, on which the ring shaped article in a heated condition is placed; a pair of receiving rolls, which rollingly contact an outer peripheral surface of the ring shaped article on the support table; a press roll provided in opposition to the pair of the receiving rolls with the ring shaped article intervening therebetween; a press roll drive mechanism for driving the press roll between an advanced position, at which the press roll is urged against the outer peripheral surface of the ring shaped article, and a retracted position, at which the press roll is separated away from the outer peripheral surface of the ring shaped article; and a press roll rotating mechanism for rotating the press roll then urged against the ring shaped article by the press roll drive mechanism.

[Mode 2]
The ring shaped article deformation correcting device as defined in Mode 1 above, further comprising a roll interval adjusting mechanism for adjusting the interval between the receiving rolls.

[Mode 3]
The ring shaped article deformation correcting device as defined in Mode 1 above, in which the length of time required to perform a deformation correction with the press roll urged against the outer peripheral surface of the ring shaped article is within the range of 40 to 90 seconds.

[Mode 4]
The ring shaped article deformation correcting device as defined in Mode 1 above, in which the temperature of the ring shaped article at the time a deformation correction is initiated with the press roll urged against the outer peripheral surface of the ring shaped article is 20° C. to 50° C. higher than the martensitic transformation point.

[Mode 5]
The ring shaped article deformation correcting device as defined in Mode 1 above, further comprising an oil bath for cooling purpose and a deformation correcting time cooling mechanism for immersing the ring shaped article into a quenching oil, contained within the oil bath, at the time of deformation correction to thereby cool the ring shaped article.

[Mode 6]
The ring shaped article deformation correcting device as defined in Mode 5 above, in which the deformation correcting time cooling mechanism comprises a support unit for tiltably supporting the support table such that a ring shaped article support area of the support table, where the ring shaped article is placed, may be lowered, and a tilting unit for tilting the support table supported by the support unit, so that when the support table is tilted by the tilting unit, the ring shaped article can be immersed into the quenching oil within the oil bath.

[Mode 7]
The ring shaped article deformation correcting device as defined in Mode 1 above, in which the ring shaped article is a raceway ring of a bearing assembly.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A deformation correcting device to correct a deformation occurring in a ring shaped article, which has been heated, while the heated ring shaped article is cooled, comprising:
   a support table, on which the ring shaped article in a heated condition is placed;
   a pair of receiving rolls, which rollingly contact an outer peripheral surface of the ring shaped article on the support table;
   a press roll provided in opposition to the pair of the receiving rolls with the ring shaped article intervening therebetween;
   a press roll drive mechanism for driving the press roll between an advanced position, at which the press roll is urged against the outer peripheral surface of the ring shaped article, and a retracted position, at which the press roll is separated away from the outer peripheral surface of the ring shaped article;
   a press roll rotating mechanism for rotating the press roll then urged against the ring shaped article by the press roll drive mechanism; and
   a roll interval adjusting mechanism for adjusting the interval between the receiving rolls.

2. The deformation correcting device as claimed in claim 1, further comprising an oil bath for cooling purpose and a deformation correcting time cooling mechanism for immersing the ring shaped article into a quenching oil, contained within the oil bath, at the time of deformation correction to thereby cool the ring shaped article.

3. The deformation correcting device as claimed in claim 2, wherein the deformation correcting time cooling mechanism comprises a support unit for tiltably supporting the support table such that a ring shaped article support area of the support table, where the ring shaped article is placed, may be lowered, and a tilting unit for tilting the support table supported by the support unit, and
   the tilting unit is configured to tilt the support table so that the ring shaped article is immersed into the quenching oil within the oil bath and the press roll drive mechanism and the press roll rotating mechanism are not immersed in the oil bath.

\* \* \* \* \*